Patented Apr. 6, 1926.

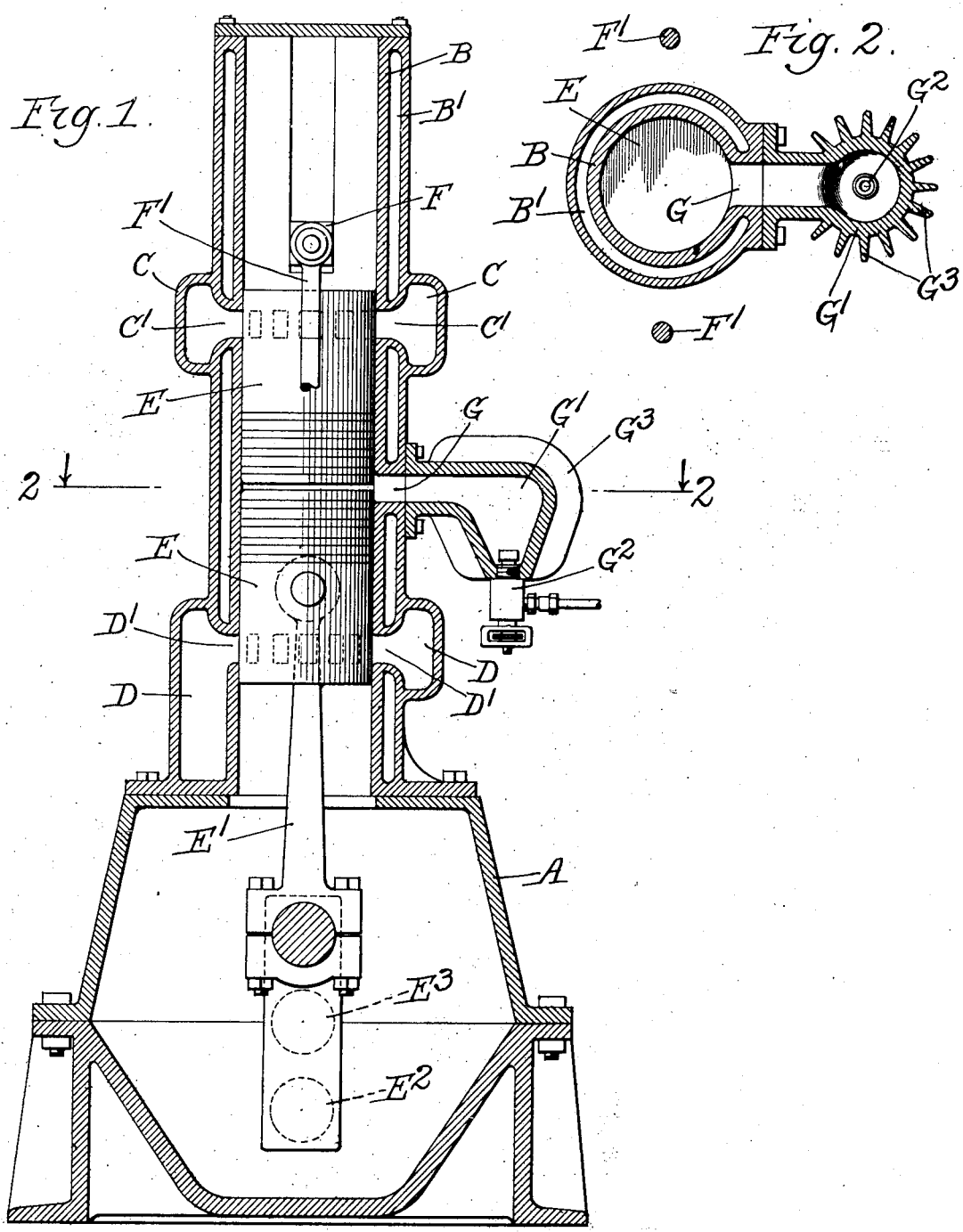

1,579,664

UNITED STATES PATENT OFFICE.

PHILIP LANE SCOTT, OF CHICAGO, ILLINOIS, ASSIGNOR TO SUPER DIESEL TRACTOR CORPORATION, OF LA PORTE, INDIANA, A CORPORATION OF NEW YORK.

SEPARATE COMBUSTION CHAMBER FOR DOUBLE-PISTON ENGINES.

Application filed August 19, 1921. Serial No. 493,612.

*To all whom it may concern:*

Be it known that I, PHILIP LANE SCOTT, a citizen of the United States, residing at Chicago, in the county of Cook and State of Illinois, have invented a certain new and useful Improvement in Separate Combustion Chambers for Double-Piston Engines, of which the following is a specification.

This invention relates to a double piston internal combustion engine. In such engines the combustion chamber is normally formed by the two ends of the two pistons and by a comparatively small portion of the engine cylinder. This method of enclosing the combustion space together with the fact that there are no valves and that the exhaust and scavenging ports are arranged at the opposite ends of the cylinder, presents very small opportunity to attain turbulence during the injection and combustion period.

The benefits of turbulence within the cylinder include a better mixing of the fuel with the air and the better distribution of the flame. This results in better firing conditions and in decreasing the tendency to detonation, and in general the well recognized improvement due to turbulence within the cylinder, of the conditions under which burning takes place.

Single piston engines present much better opportunity for obtaining this turbulence. In fact some turbulence is an inherent feature of all single piston designs whether due to the valves alone or the ports alone or the combination of valves and ports. In double piston engines it is possible to avoid turbulence almost entirely and to attain almost perfect stratification between the incoming scavenging air and the outgoing burned gas. This is a distinct advantage and one to be retained, in that the charge of fresh air is much less mixed with the burned gases than is the case with any single piston construction, and the amount of scavenging air required to obtain complete cleaning of the cylinder is materially less.

It is generally recognized that the least desirable way of obtaining scavenging is through valves and ports. Since the greatest turbulence is set up at the beginning of compression when it is of least aid to the combustion, and when it increases the amount of fresh air needed by causing mixing of the fresh air with the burned gas. The most desirable time at which to obtain turbulence is at the end of the compression stroke just preceding and during the combustion period. Less energy is required and there are no scavenging losses.

In double piston engines it is possible to obtain turbulence at the beginning of compression through the way in which the scavenging air is introduced, but this not only tends to destroy one of the advantages of the double piston engine, namely the scavenging, and is the least effective method of obtaining turbulence.

The use of the separate combustion chamber presents particular advantages when used in connection with double piston engines.

It is therefore one of the objects of this invention to produce turbulence in a double piston engine in the most desirable way, namely, at the end of the stroke and to do this without losing the normal scavenging advantages and without the use of valves or especially shaped ports. With this end in view, I have provided in connection with my engine a separate combustion chamber which lies outside of the engine cylinder and communicates therewith at the point where the two piston heads will normally most closely approach each other.

One object of this construction, as above stated, is to produce turbulence in the most desirable fashion at the most favorable point in the engine cycle. Another result from this construction is the better cooling conditions, since with the separate combustion chamber the cooling conditions of that chamber may be considered and controlled separately from those of the rest of the engine. This is, of course, entirely impossible where the combustion chamber is within the engine cylinder and between the two pistons. In this latter case the heat, which must ultimately be transmitted to the water jacket passes successively through the piston head, skirt and wall of the cylinder. In my construction the greatest portion of the heat, which will inevitably be lost, passes directly through the wall of the combustion chamber, however cooled. Thus the pistons are greatly relieved from the destructive influence of the heat flow and their ultimate life is materially increased, and lubrication conditions are largely improved.

I have illustrated my invention more or less diagrammatically in the accompanying drawings, wherein—

Figure 1 is a vertical section of my engine;

Fig. 2 is a horizontal section taken on line 2—2 of Figure 1.

Like parts are designated by like characters throughout.

A is the crankcase of my engine upon which is mounted the cylinder B which is surrounded by the cooling water jacket B¹. Adjacent the top of the cylinder is the exhaust duct C which communicates by means of the ports C¹ with the interior of the engine cylinder. Adjacent the bottom of the cylinder is the scavening duct D which communicates by means of the ports D¹ D¹ with the interior of the cylinder. Scavenging air is supplied to this duct by means of any suitable pump, not here shown, as the details thereof form no part of the present invention. Mounted for reciprocation within the cylinder are the pistons E E, the lower piston being carried by the rod E¹. The upper piston is connected to the outer two throws E² E², only one of the throws being indicated in Fig. 1, of the three throw crank shaft E³ by a yoke F and two side rods F¹ F¹ only one of which is shown in Figure 1.

Adapted to communicate with the interior of the cylinder at the point where the piston heads normally most closely approach each other, by means of the constricted throat G, is the separate combustion chamber G' within which is mounted the injection valve G². Fuel is supplied to this valve by means of any suitable pump through a fuel line, neither of which are here shown as they form no part of the present invention. The method of injection may be what is known as solid or direct injection or air injection. The combustion chamber has about it the cooling vanes G³. As shown this combustion chamber is air cooled; it could, however, be water cooled, in which case it would be surrounded by a water jacket. As this construction is obvious, I have not illustrated it in detail.

Although I have shown the additional combustion chamber as communicating with the cylinder proper through a restricted throat, and as an entirely separate, still it would be possible to have this additional combustion chamber constructed as a unit with the cylinder and to omit the contact through it so that the communication between the additional combustion chamber and the cylinder is open and substantially unobstructed.

The use and operation of my invention are as follows:

When the engine is in operation the piston heads reciprocate oppositely moving toward and away from each other. As above noted, the combustion chamber communicates with the interior of the cylinder at the point at which the piston heads most closely approach each other. As the piston heads move toward each other, the air in the cylinder is forced outward into the combustion chamber through the constricted throat. It enters the chamber at considerable velocity and is compelled to change its direction upon meeting the further wall of the combustion chamber and assume a generally rotary motion giving a desirable form of turbulence. The spray of fuel is so directed into this current as to best mix with the air and to carry the flame rapidly to the further parts of the chamber.

I claim:

1. Means for creating turbulence in the cylinder of a double piston internal combustion engine comprising a combustion chamber additional to and communicating through a restricted throat with the cylindrical portion of the cylinder, said pistons adapted during their compression stroke to force substantially all of the air into said combustion chamber from the cylindrical portion of the cylinder to cause turbulence, said combustion chamber shaped so as to promote regular eddying of the charge of air so forced into it.

2. Means for creating turbulence in the cylinder of a double piston internal combustion engine comprising a combustion chamber additional to and communcating through a restricted throat with the cylindrical portion of the cylinder, said pistons adapted during their compression stroke to force substantially all of the air into said combustion chamber from the cylindrical portion of the cylinder to cause turbulence, said combustion chamber shaped so as to promote regular eddying of the charge of air so forced into it, and a spray valve within said combustion chamber adapted to co-operate with such current of air in promoting the mixing and burning of the fuel.

3. In an internal combustion engine the combination of a cylinder open at both ends and two oppositely moving pistons mounted and adapted to move therein, said pistons approaching each other at the inner dead center position, a combustion chamber connected to said cylinder at approximately the plane of closest approach of said pistons, said chamber connected by a restricted throat to said cylinder, said pistons adapted to force substantially all the air from the cylinder proper through said throat said chamber so shaped that the charge of air forced therein by the approaching pistons is caused to move in a regular and predetermined path, a fuel nozzle adapted to spray fuel into said chamber, said chamber shaped to conform accurately and closely to the shape of such spray, said nozzle being mounted within said chamber so as to fill the same with fuel and also to co-operate with the regularly moving current of air to produce complete mixture of the fuel and air, the temperature of said combustion chamber being substantially independent of the temperature of said cylinders.

Signed at Chicago county of Cook and State of Illinois, this 16th day of August 1921.

PHILIP LANE SCOTT.